United States Patent
Wiley et al.

(10) Patent No.: US 8,056,324 B2
(45) Date of Patent: Nov. 15, 2011

(54) REGENERATION SYSTEM

(75) Inventors: Stephen M. Wiley, East Peoria, IL (US); Robert L. Miller, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1202 days.

(21) Appl. No.: 11/806,375

(22) Filed: May 31, 2007

(65) Prior Publication Data

US 2008/0295485 A1    Dec. 4, 2008

(51) Int. Cl.
- *F01N 3/00* (2006.01)
- *F01N 3/02* (2006.01)
- *F02B 27/04* (2006.01)

(52) U.S. Cl. ........... 60/290; 60/273; 60/287; 60/289; 60/295; 60/311

(58) Field of Classification Search .......... 60/273, 60/285, 287–293, 295, 303, 311, 274; 123/321–322
See application file for complete search history.

(56) References Cited

U.S. PATENT DOCUMENTS

| | | | |
|---|---|---|---|
| 3,906,723 A * | 9/1975 | Matumoto et al. | 60/290 |
| 4,257,227 A * | 3/1981 | Sato et al. | 60/290 |
| 5,050,376 A | 9/1991 | Stiglic et al. | |
| 7,111,450 B2 | 9/2006 | Surnilla | |
| 2005/0172617 A1 | 8/2005 | Persson | |
| 2005/0220688 A1 | 10/2005 | Allansson et al. | |
| 2007/0000241 A1 * | 1/2007 | Funke et al. | 60/295 |

FOREIGN PATENT DOCUMENTS

| | | |
|---|---|---|
| EP | 1426593 | 6/2004 |
| GB | 2367859 | 4/2002 |
| JP | 55-128634 | 10/1980 |
| WO | 03/095808 | 11/2003 |

* cited by examiner

*Primary Examiner* — Thomas Denion
*Assistant Examiner* — Audrey Klasterka
(74) *Attorney, Agent, or Firm* — Finnegan, Henderson, Farabow, Garrett & Dunner LLP

(57) ABSTRACT

An regeneration system for use in a power system is disclosed. The regeneration system may include a source of intake air, an engine brake configured to reduce the speed of an engine by compression and release of the intake air, and a valve configured to divert a portion of the intake air to an auxiliary device. The regeneration system may further include a controller in communication with the engine brake and the valve. The controller may be configured to move the valve to reduce the portion of intake air diverted to the auxiliary device when the engine brake is active.

15 Claims, 4 Drawing Sheets

REGENERATION SYSTEM

TECHNICAL FIELD

The present disclosure relates generally to a regeneration system and, more particularly, to a regeneration system that deactivates particulate trap regeneration during engine braking.

BACKGROUND

Modern diesel engines often include subsystems designed to increase performance. One example of such a subsystem includes an engine brake. An engine brake can be used to slow a vehicle faster than service brakes and without significant component wear by, for example, opening the engine's exhaust valves during a compression stroke of the engine. Opening the exhaust valves releases kinetic energy transferred from the moving vehicle to the air in the engine's cylinders in the form of compression and heat, and minimizes the energy returned back to the vehicle. The amount of engine braking is dependent upon the amount of air available for compression in the cylinder. That is, a larger volume of air within the cylinder will require and, thus, dissipate more compression energy. Therefore an engine brake will provide more braking when more air is available.

Another example of a performance enhancing engine subsystem includes a particulate trap and associated regeneration device. Diesel engines exhaust a complex mixture of air pollutants composed of solid particulate material in the form of unburned carbon particles. In order to meet stringent emissions standards, engine manufacturers have developed devices for treatment of engine exhaust after it leaves the engine. One such exhaust treatment device is the particulate trap, which includes a filter designed to collect particulate matter from the exhaust flow of an engine. The use of the particulate trap for extended periods of time, however, enables particulate matter to accumulate on the filter, thereby causing damage to the filter and/or a decline in engine performance. One method of restoring the performance of a particulate trap includes regeneration. Regeneration of a particulate trap filter is accomplished by increasing the temperature of the filter and the trapped particulate matter above the combustion temperature of the particulate matter, thereby burning away the collected particulate matter. This increase in temperature may be accomplished by heating the exhaust gases upstream from the particulate trap with the use of a burner that creates a flame within the exhaust conduit leading to the particulate trap. The burner may include a fuel injector for creating the flame, and the burner may be supplied with air from the intake system of the engine.

As the number and complexity of engine subsystems increases, so does their interaction with and effect upon each other. For example, if air from the engine intake is supplied to the regeneration device to aid in combustion, then the effectiveness of engine braking may be reduced due to the reduced amount of air available for compression within the cylinders. Each engine subsystem and its related control can be designed to either isolate effects upon other subsystems, or to allow the subsystems to cooperate and positively effect each other.

One example of an engine having cooperating subsystems is described in U.S. Patent Application Publication no. 2005/0172617 (the '617 publication) by Persson, published on Aug. 11, 2005. The '617 publication discloses a method of regenerating a particulate filter by injecting fuel into an exhaust stream to raise the temperature of the exhaust. The injected fuel is oxidized by an oxidation catalyst upstream from particulate filters, thereby heating the exhaust and the particulate filter to a temperature sufficient to ignite carbon particles trapped in the particulate filter. Because the injected fuel, by itself, may be insufficient to ignite the trapped carbon particles, the regeneration system only operates during periods of engine braking, due to the increased exhaust temperatures that occur during engine braking. In this manner, heat from the injected fuel, combined with the elevated exhaust temperatures of engine braking, may be sufficient to regenerate the particulate filter.

While the system of the '617 publication may allow related subsystems to positively affect each other, it may be too limiting. Specifically, although the system may be capable of sufficiently regenerating a particulate filter, it is dependent upon the activation of engine braking. In instances where engine braking is not active or only active for a short time (i.e. a time insufficient to produce adequate temperatures), regeneration may be only minimally successful, thereby leading to reduced engine performance and economy, and an increased need for particulate filter service.

The system of the present disclosure solves one or more of the problems set forth above.

SUMMARY OF THE DISCLOSURE

One aspect of the present disclosure is directed to a regeneration system. The regeneration system may include a source of intake air, an engine brake configured to reduce the speed of an engine by compression and release of the intake air, and a valve configured to divert a portion of the intake air to an auxiliary device. The regeneration system may further include a controller in communication with the engine brake and the valve. The controller may be configured to move the valve to reduce the portion of intake air diverted to the auxiliary device when the engine brake is active.

Another aspect of the present disclosure is directed to a method of regenerating a particulate trap. The method may include providing a supply of air to at least one combustion chamber of an engine and diverting a portion of the supply of air to an auxiliary device. The method may also include slowing the engine using the remaining supply of air. The method may further include reducing the portion of air diverted when the engine is being slowed.

DETAILED DESCRIPTION

Figure 1:
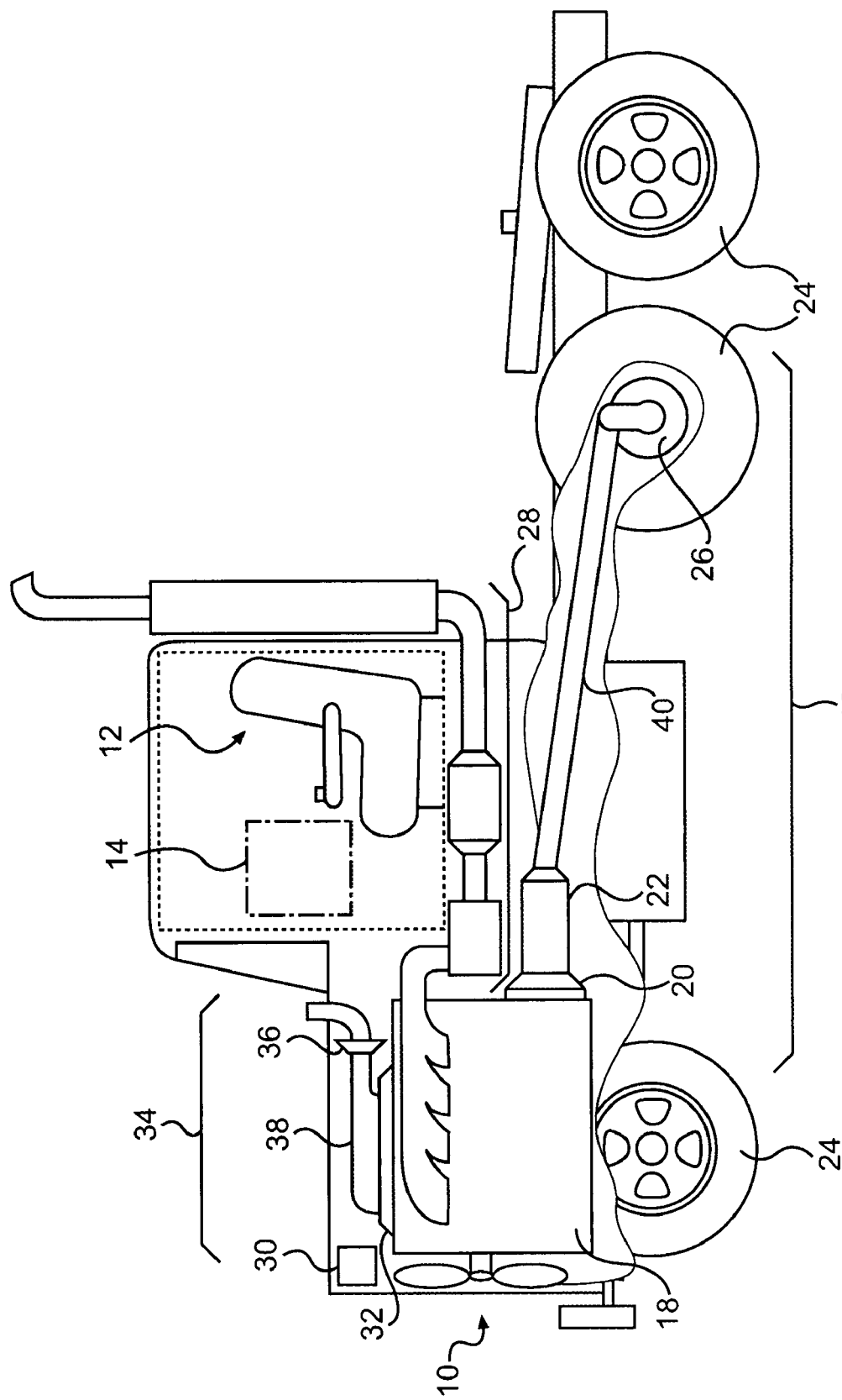
FIG. 1 is a diagrammatic illustration of a vehicle according to an exemplary disclosed embodiment.

FIG. 1 illustrates a vehicle 10. Vehicle 10 may embody an on-highway vocational truck, a passenger vehicle, a mining machine, a construction machine, farming equipment, or any other vehicle or machine known in the art. Although vehicle 10 is shown as a truck, vehicle 10 could be any type of mobile machine having an exhaust producing power source. Vehicle 10 may include an operator station 12, a drivetrain 16, and a brake mechanism 26. Drivetrain 16 and brake mechanism 26 may be controlled by way of operator station 12.

Operator station 12 may receive input from an operator indicative of a desired function of vehicle 10. Operator station 12 may include an operator interface 14 having one or more control devices such as a throttle pedal (not shown) to control a speed or torque of drivetrain 16, a brake pedal (not shown) to control operations of brake mechanism 26, a steering wheel (not shown) to control an orientation of vehicle 10, and a gear selector (not shown) associated with ratio control of drivetrain 16. Operator interface 14 may embody a proportional or on/off-type controller such as, for example, single or multi-axis joysticks, wheels, knobs, push-pull devices, switches, and other operator interface devices known in the art.

Drivetrain 16 may include a power source 18, a torque converter 20, a transmission 22, and one or more traction devices 24. Power source 18 may transmit power through a torque converter 20 to transmission 22, and from transmission 22 to traction devices 24. Power source 18 may be any kind of power source that combusts fuel and air to produce power and a flow of exhaust gases. For example, power source 18 may be an internal combustion engine, such as a gasoline engine, a diesel engine, a natural gas engine or any other exhaust producing engine. Power source 18 may include an induction system 34 that provides compressed combustion air to power source 18, and an engine brake 32 that may use compressed air from the induction system 34 to slow vehicle 10. Power source 18 may direct a flow of exhaust gas to an exhaust system 28 through an exhaust conduit 56. A power source speed sensor 50 may be associated with power source 18 to detect and communicate an operating speed of power source 18.

Induction system 34 may include a means for introducing charged air into the cylinders (not shown) of power source 18. For example, induction system 34 may include a compressor 36 in fluid communication with the cylinders via an intake conduit 38. Compressor 36 may compress the air flowing into power source 18 to a predetermined pressure level and direct the compressed air to the cylinders via intake conduit 38. It is contemplated that additional and/or different components may be included within induction system 34 such as, for example, an air cooler, a bypass valve, a throttle valve, an air cleaner, a pressure relief device, and other means known in the art for introducing charged air into power source 18.

Figure 3:
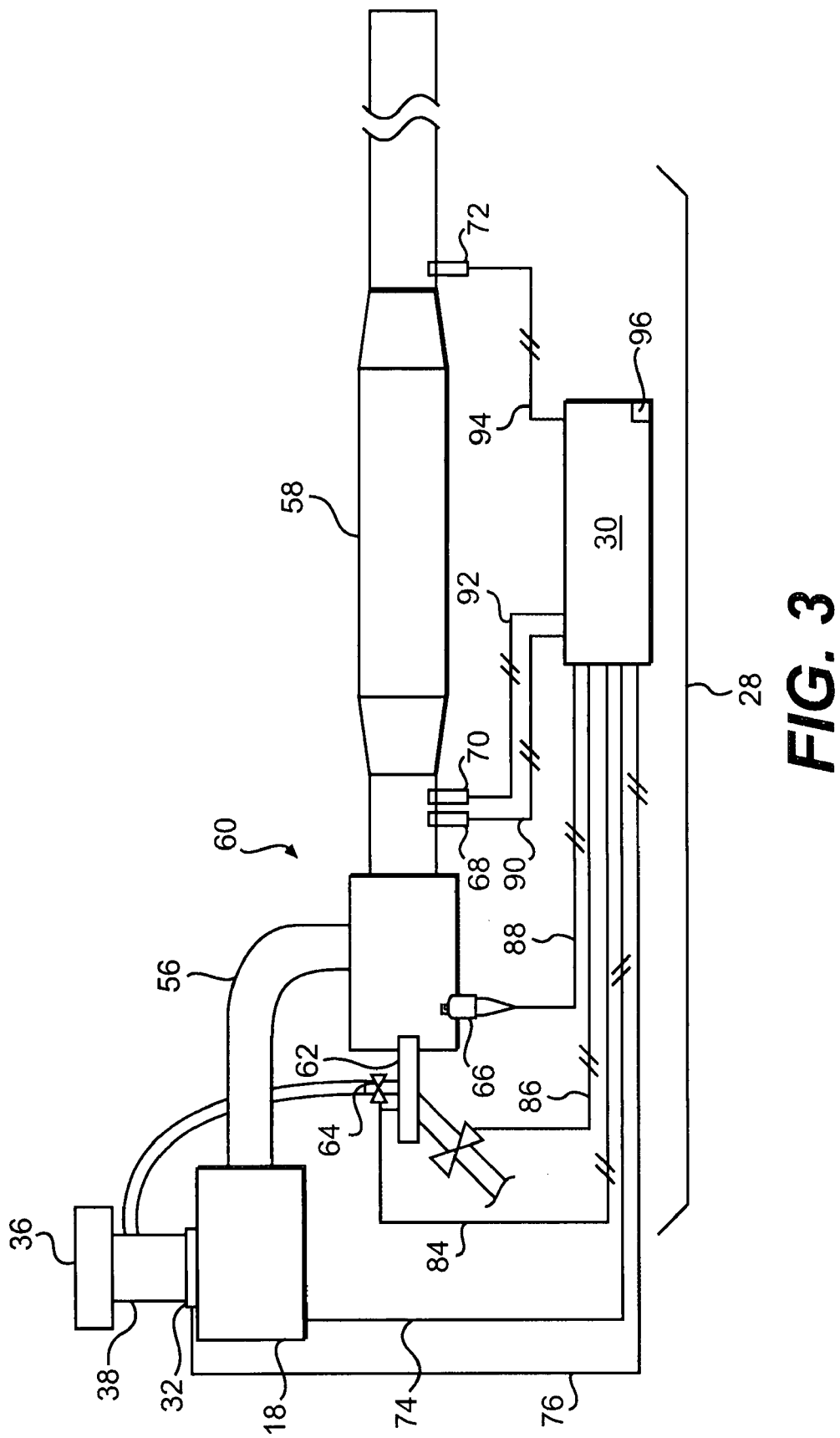
FIG. 3 is a diagrammatic illustration of an exemplary disclosed exhaust system for use with the vehicle of FIG. 1.

Exhaust system 28 may include an exhaust conduit 56, an after-treatment device 58 and a regeneration unit 60 (as shown in FIG. 3). Exhaust conduit 56 may direct the exhaust gas flow from power source 18 through after-treatment device 58 to the atmosphere. After-treatment device 58 may be any type of device configured to remove one or more constituents from the exhaust flow of power source 18, and which may be periodically regenerated by regeneration unit 60. In one embodiment, after-treatment device 58 may include a particulate trap or diesel particulate filter (DPF).

Exhaust system 28 may include an upstream pressure sensor 70 and a downstream pressure sensor 72. Such sensors may be positioned along exhaust conduit 56 upstream and downstream from after-treatment device 58, respectively, and configured to measure the pressure of the exhaust gases within exhaust conduit 56 at their respective locations. Upstream pressure sensor 70 and downstream pressure sensor 72 may constitute a pressure differential measurement system. Such a system may measure a differential between a pressure of the exhaust flow upstream from after-treatment device 58 and a pressure of the exhaust flow downstream from after-treatment device 58. Alternatively, in lieu of upstream pressure sensor 70 and downstream pressure sensor 72, the pressure differential measurement system may include a single differential pressure sensor (not shown) configured to measure a difference in pressure between the exhaust flow upstream and downstream of after-treatment device 58.

Torque converter 20 may be a hydro-mechanical device configured to couple power source 18 to transmission 22. In particular, torque converter 20 may conduct pressurized fluid between an output of power source 18 and an input of transmission 22 to thereby drive transmission 22, while still allowing power source 18 to rotate somewhat independently of transmission 22. In addition, torque converter 20 may include a lockup clutch (not shown) for directly mechanically coupling the output of power source 18 to the input of transmission 22. In this arrangement, torque converter 20 may selectively absorb and multiply the torque transferred between power source 18 and transmission 22 by either allowing or preventing slippage between the output rotation of power source 18 and the input rotation of transmission 22. It is further contemplated that torque converter 20 may alternatively embody a non-hydraulic device such as, for example, a mechanical diaphragm clutch.

Transmission 22 may include numerous components that interact to transmit power from torque converter 20 to traction device 24. In particular, transmission 22 may embody a multi-speed, bidirectional, mechanical transmission having a neutral gear ratio, a plurality of forward gear ratios, a reverse gear ratio, and one or more clutches (not shown). The clutches may be selectively actuated to engage predetermined combinations of gears (not shown) that produce a desired output gear ratio. Transmission 22 may be an automatic-type transmission, wherein shifting is based on a power source speed, a maximum selected gear ratio, and a shift map stored within a transmission controller. Alternatively, transmission 22 may be a manual-type transmission, wherein selection of each gear ratio is performed directly by an operator. The output of transmission 22 may be connected to rotatably drive traction device 24 via a shaft 40, thereby propelling vehicle 10.

Traction device 24 may include wheels located on each side of vehicle 10 (only one side shown). Alternately, traction device 24 may include tracks, belts, or other driven traction devices. Traction device 24 may be driven by transmission 22 to rotate in accordance with an output rotation of transmission 22. A travel speed sensor 52 may be associated with traction device 24 to detect and communicate the travel speed of vehicle 10.

Brake mechanism 26 may retard the motion of vehicle 10 and may be operably associated with each traction device 24 of vehicle 10. In one embodiment, brake mechanism 26 may embody a hydraulic pressure-actuated wheel brake such as, for example a disk brake or a drum brake, as is commonly known in the art. It is contemplated that brake mechanism 26 may alternatively embody another non-hydraulic type of wheel brake such as an electric motor or any other similar mechanism known in the art.

Figure 2:
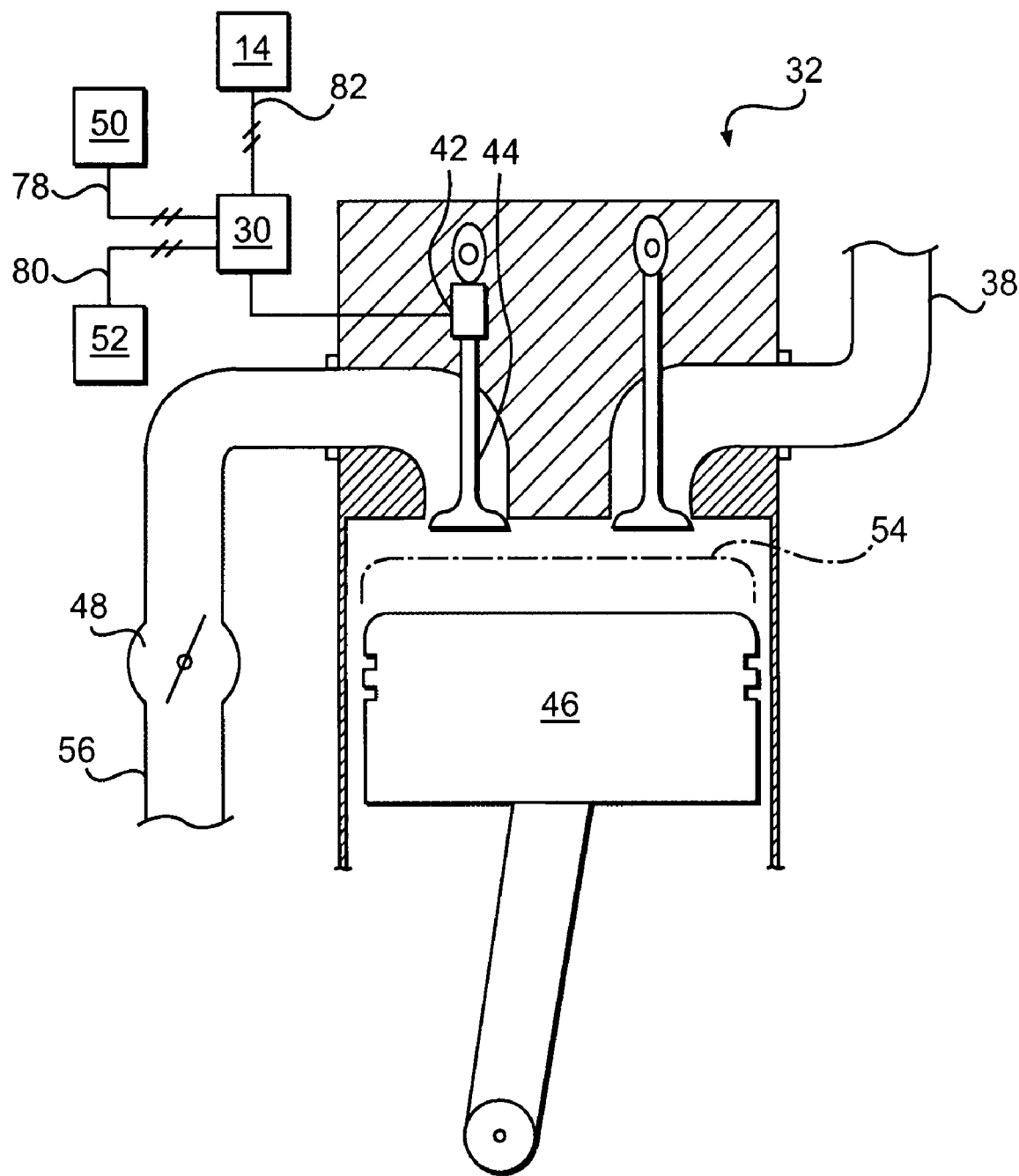
FIG. 2 is a diagrammatic illustration of an exemplary disclosed engine brake for use with the vehicle of FIG. 1.

As shown in the exemplary embodiment of FIG. 2, engine brake 32 may cooperate with power source 18 to decelerate vehicle 10. Engine brake 32 may embody an engine compression brake, an exhaust brake, or any other device that selectively increases the natural resistance of power source 18 to motion. In a compression brake embodiment, an actuator 42 of engine brake 32 may open an exhaust valve 44 of power source 18 near the top dead center (TDC) position 54 of an associated piston's compression stroke. By opening exhaust valve 44 near the TDC position 54, highly-compressed air may be vented to the atmosphere, thereby removing stored energy from the pistons 46. On the ensuing downward power stroke, essentially no energy is returned to piston 46 (and to traction device 24 via transmission 22), resulting in a deceleration of vehicle 10. In an alternative exhaust brake embodiment, a valve 48 may be disposed within exhaust conduit 56 to restrict the flow of exhaust gases exiting power source 18. The restricted flow of exhaust gases may cause a backup of pressure within power source 18 that increases the work that piston 46 must perform during the compression and exhaust strokes. The increasing backpressure results in a deceleration of vehicle 10. It is contemplated that engine brake 32 may be hydraulically operated, mechanically operated, electrically operated, pneumatically operated, or operated in any other suitable manner. In another alternative engine brake embodiment, engine brake 32 may be a constant-lift type engine brake. In such an arrangement, during engine braking, actuator 42 may operate similarly to the embodiment described above, except that actuator 42 may be used to prevent exhaust valve 48 from fully closing, thereby maintaining exhaust valve 48 in an open position at all or nearly all times. Under such operation, actuator 42 may create a small gap, for example, a one millimeter gap, between exhaust valve 44 and a valve seat (not shown). Such an arrangement may provide sufficient engine braking power, but with a lower noise level than that associated with the engine brake embodiment as described above.

Although after-treatment device 58 is discussed herein primarily as being a particulate trap, in other embodiments, after-treatment device 58 may alternatively or additionally include a catalytic converter, a catalyzed particulate trap, a NOx adsorber, or any other type of after-treatment device that may be regenerated or requires a rise in temperature for proper operation. Alternatively or additionally, after-treatment device 58 may include combinations of these devices. For example, after-treatment device 58 may include a particulate trap and catalytic converter disposed in series, which, in some embodiments, may be integrated into the same unit (e.g., located within the same housing).

After-treatment device 58 may be thermally regenerated. That is, regeneration of after-treatment device 58 may be accomplished by increasing the temperature of after-treatment device 58. Such increases in temperature of after-treatment device 58 may be accomplished in a number of different ways. For example, heat may be directly applied to after-treatment device 58 via a heating unit integral with or adjacent to after-treatment device 58, such as an electric heating element (not shown). Alternatively or additionally, the temperature of after-treatment device 58 may be increased by heat transferred to it from the exhaust gases flowing through it. In such embodiments, heat may be applied to the exhaust gases at a location upstream from after-treatment device 58.

The temperature of the exhaust gases may be increased in one or more ways. In one embodiment, altering engine parameters may have an effect on exhaust gas temperature. For example, running power source 18 with a "rich" air/fuel mixture may increase the exhaust gas temperature. Increases in engine load may also increase the exhaust gas temperature. Exhaust gases may also be heated by way of post injection events. Post injection involves injecting additional fuel into the combustion chambers of power source 18 after a majority of the combustion has taken place. This may result in the additional fuel being burned in exhaust system 28, thereby elevating the temperature of the exhaust gases in the system. In an alternative embodiment, exhaust temperature may be raised by locating a heating element directly in the exhaust gases or in contact with exhaust conduit 56. For example, a flame producing burner may be situated to provide the necessary heat.

Regeneration unit 60 may be positioned anywhere along exhaust conduit 56 between power source 18 and after-treatment device 58 to directly raise the temperature of the exhaust exiting power source 18. Regeneration unit 60 may include a fuel injector 62 configured to inject fuel into the exhaust flow, an air valve 64 configured to mix pressurized air with the injected fuel, and an ignition source 66 configured to ignite the mixture. Regeneration unit 60 may create a flame, which may be in a heat exchange relationship with the exhaust flow. Current may be supplied to ignition source 66 to ignite the air/fuel mixture before or after the mixture is delivered into the exhaust flow. Ignition source 66 may include a spark plug, a heater, a glow plug or any other means for igniting an air/fuel mixture.

It is contemplated that in some embodiments, air valve 64 may additionally or alternatively be configured to divert air to one or more auxiliary devices other than regeneration unit 60 that rely on air from valve 64 for effective operation. For example, it is contemplated that in some embodiments, after-treatment device 58 may include a triple-bed catalytic converter, which may be configured to create a rise in exhaust temperature using air supplied by air valve 64, but without the need for a separate regeneration unit which combusts a fuel/air mixture to raise the temperature of the exhaust flow. Other auxiliary devices that use air from air valve 64 may include, for example, other exhaust system devices (not shown) that rely on intake air for effective operation, components of a cabin climate control system (not shown) for operator station 12, supplemental or auxiliary air reservoirs (not shown) for brake mechanism 26, windshield wipers (not shown), and/or air operated suspension components (not shown).

Compressor 36 of induction system 34 may supply the compressed air for mixing with the fuel for combustion, as well as for flushing fuel injector 62 of any fuel or debris before and/or after operation of regeneration unit 60. That is, air may be routed from induction system 34 at a location downstream from compressor 36 to fuel injector 62. The supply of air to fuel injector 62 may be regulated by an air valve 64. Air valve 64 may include a valve element (not shown) that controls the airflow rate to regeneration unit 60, and that can move to any position between a closed position, at which substantially no air is supplied from induction system 34 to regeneration unit 60, to an open position, at which a predetermined amount of air is supplied to regeneration unit 60. The valve element may embody a butterfly valve element, a gate valve element, a ball valve element, a globe valve element, or any other type of valve element known in the art for providing control of air flow.

A temperature sensor 68 may be associated with exhaust conduit 56 and located downstream of regeneration unit 60 to detect and communicate a temperature of the exhaust gas flow exiting regeneration unit 60. Temperature sensor 68 is shown, for example, as being located within exhaust conduit 56. One skilled in the art, however, will recognize that temperature sensor 68 may also include additional sensing elements located, for example, downstream of after-treatment device 58, to detect and communicate exhaust gas temperature downstream of after-treatment device 58. Additionally, a temperature sensing element may be located upstream of regeneration unit 60 to sense a temperature of the exhaust gas flow entering regeneration unit 60.

Controller 30 may be associated with one or more of drivetrain 16 and exhaust system 28 to control power source 10, engine brake 32, and regeneration unit 60 in response to various inputs. Controller 30, shown in FIGS. 1, 2, and 3, may embody a single microprocessor or multiple microprocessors that include a means for controlling an operation of power source 18. Numerous commercially available microprocessors can perform the functions of controller 30. It should be appreciated that controller 30 could readily embody a general engine control unit (ECU) capable of controlling numerous engine functions. Controller 30 may include all of the components required to run an application such as, for example, a memory, a secondary storage device, and a processor, such as a central processing unit or any other means known in the art for controlling power source 18, engine brake 32, and regeneration unit 60. Various other known circuits may be associated with controller 30, including power supply circuitry, signal-conditioning circuitry, solenoid driver circuitry, communication circuitry, and other appropriate circuitry.

As shown in FIG. 2, controller 30 may communicate with engine brake 32 via a communication line 76, with power source speed sensor 50 via a communication line 78, with travel speed sensor 52 via a communication line 80, and with operator interface 14 via a communication line 82. As shown in FIG. 3 controller 30 may also communicate with power source 18 via a communication line 74, with air valve 64 via a communication line 84, with fuel injector 62 via a communication line 86, with ignition source 66 via a communication line 88, with temperature sensor 68 via a communication line 90, with upstream pressure sensor 70 via a communication line 92, and with downstream pressure sensor 72 via a communication line 4. In response to inputs from power source 18, engine brake 32, regeneration unit 60, various sensors, and/or from other sources, controller 30 may control operation of engine brake 32 and regeneration unit 60.

Controller 30 may receive and store in memory various communications from power source 18, operator interface 14, engine brake 32, power source speed sensor 50, travel speed sensor 52, air valve 64, fuel injector 62, ignition source 66, temperature sensor 68, upstream pressure sensor 70, and downstream pressure sensor 72, including, for example, a status of engine brake 32, a status of regeneration unit 60, a status of vehicle 10, a status of power source 18, an exhaust temperature, and exhaust pressures. Controller 30 may analyze and compare received and stored data, and, based on instructions and data stored in memory or input by a user, determine whether action is required. For example, controller 30 may compare received values with target values stored in memory, and, based on the results of the comparison, controller 30 may transmit signals to one or more systems to alter the operating status thereof.

Controller 30 may include any memory means known in the art for storing data relating to operation of power source 18, engine brake 32, and regeneration unit 60. The data may be stored in the form of one or more maps that describe and/or relate operation of power source 18, engine brake 32, and regeneration unit 60. Each of these maps may be in the form of tables, graphs, and/or equations, and include a compilation of data collected from lab and/or field operation of power source 18, engine brake 32, and regeneration unit 60. The maps may be generated by performing instrumented tests on the operation of power source 10, engine brake 32, and regeneration unit 60 under a variety of operating conditions while varying parameters such as engine speed, air flow, and fuel delivery. Controller 30 may also be capable of updating the maps based on measured operating conditions, which may allow controller 30 to adjust the maps to match the particular operating characteristics and modes of an individual power source 18. Controller 30 may reference these maps and control the operation of one component in response to the desired operation of a second component. For example, controller 30 may reference the maps to control regeneration unit 60 to maintain a desired operation of engine brake 32, and vice versa. The maps may contain data on, for example, the time required for engine brake 32 to be active before controller 30 deactivates regeneration unit 60, the values of parameters that define an overspeed condition, and other data that affects the operation of regeneration unit 60 based on the operation of engine brake 32.

Controller 30 may include a timing device 96. Controller 30 may be configured to couple information from timing device 96 with information from other sources. For example, controller 30 may utilize information from timing device 96 in conjunction with information regarding operation of power source 18 to determine how long power source 18 is operated, from engine brake 32 to determine how long engine brake 32 is operated, and/or from regeneration unit 60 to determine how long regeneration unit 60 is operated. Timing device 96 may also be used to monitor and control duration of regeneration events or any other operating parameters of regeneration unit 60 and/or vehicle 10, as well as duration of retarding events or any other operating parameters of engine brake 32.

Controller 30 may be configured to activate engine brake 32 based on one or more inputs commonly known in the art and the maps stored in memory of controller 30. For example, controller 30 may monitor power source speed sensor 50, travel speed sensor 52, the operation of power source 18, and operator input received via operator interface 14, and, based on the data contained in the maps, determine that more braking power (i.e. greater deceleration) is necessary. Based on this determination, controller 30 may activate engine brake 32. Controller 30 may then monitor the operating status of engine brake 32, input from travel speed sensor 52, travel speed sensor 52, operator interface 14, other measured engine parameters, and other sensors known in the art, to determine, for example, the duration of engine brake 32 activation, whether engine brake 32 should be adjusted to provide more or less braking, and/or whether engine brake 32 should be deactivated.

Controller 30 may be configured to activate regeneration unit 60 in response to one or more trigger conditions commonly known in the art. The trigger conditions may include, for example, operation of power source 18 for a predetermined amount of time, consumption of a predetermined amount of fuel by power source 18, detection of an elevated backpressure upstream of after-treatment device 58 above a predetermined pressure, detection of an excessive pressure differential across after-treatment device 58, and/or determination that a calculated amount of particulate matter accumulated in after-treatment device 58 is above a predetermined amount. Regeneration may also be initiated manually at operator interface 14, via a switch, button, or the like associated with operator station 12 of vehicle 10, and/or a service tool configured to interface with vehicle 10. Upon activation of regeneration unit 60, controller 30 may begin monitoring the operating status of engine brake 32. Based on inputs from sensors and the data contained in one or more maps, controller 30 may alter an operating status of regeneration unit 60 upon the occurrence of certain conditions while engine brake 32 is active, by adjusting a position of air valve 64. Conditions include, for example, that engine brake 32 has been active for a specified time, and/or that an overspeed condition has been detected.

Engine brake 32 being active for a specified time may be indicative of a situation in which vehicle 10 is not decelerating quickly enough, and/or requires increased deceleration. An engine overspeed condition may be such a situation. In this situation, it may be desirable to deactivate regeneration unit 60 to provide maximum available engine braking (i.e. provide maximum air flow to cylinders of power source 18 to effect maximum energy removal). Values that determine the time of engagement for engine brake 30 before regeneration unit 60 is deactivated and/or an overspeed condition may be set during assembly of power source 18, or may be determined by controller based on inputs and data contained in the maps. An exemplary specified time may be, for example, one minute. During that one minute, regeneration unit 60 may operate normally during the first fifty-five seconds. During the last five seconds, regeneration unit 60 may operate with reduced fuel and/or air. That is, air valve 64 and fuel injector 62 may be adjusted to provide less air and fuel, respectively, to regeneration unit 60. An overspeed condition may be defined by an engine rpm, such as, for example, a specified red-line rpm limit of an engine.

If engine brake 32 is active prior to activation of regeneration unit 60, and if controller 30 determines that regeneration unit 60 should be activated, controller 30 may postpone activation of regeneration unit 60 until engine brake 32 has been inactive for longer than about thirty seconds. If controller 30 deactivated regeneration unit 60 based on the operating status of engine brake 32, then controller 30 may wait until at least three minutes without activation of engine brake 32 have passed before attempting to activate regeneration unit 60. These periods of delay in activation of regeneration unit 60 may help prevent undesirable starting and stopping of regeneration unit 60 that may result in incomplete regeneration cycles interrupted by engine brake 32.

Figure 4:
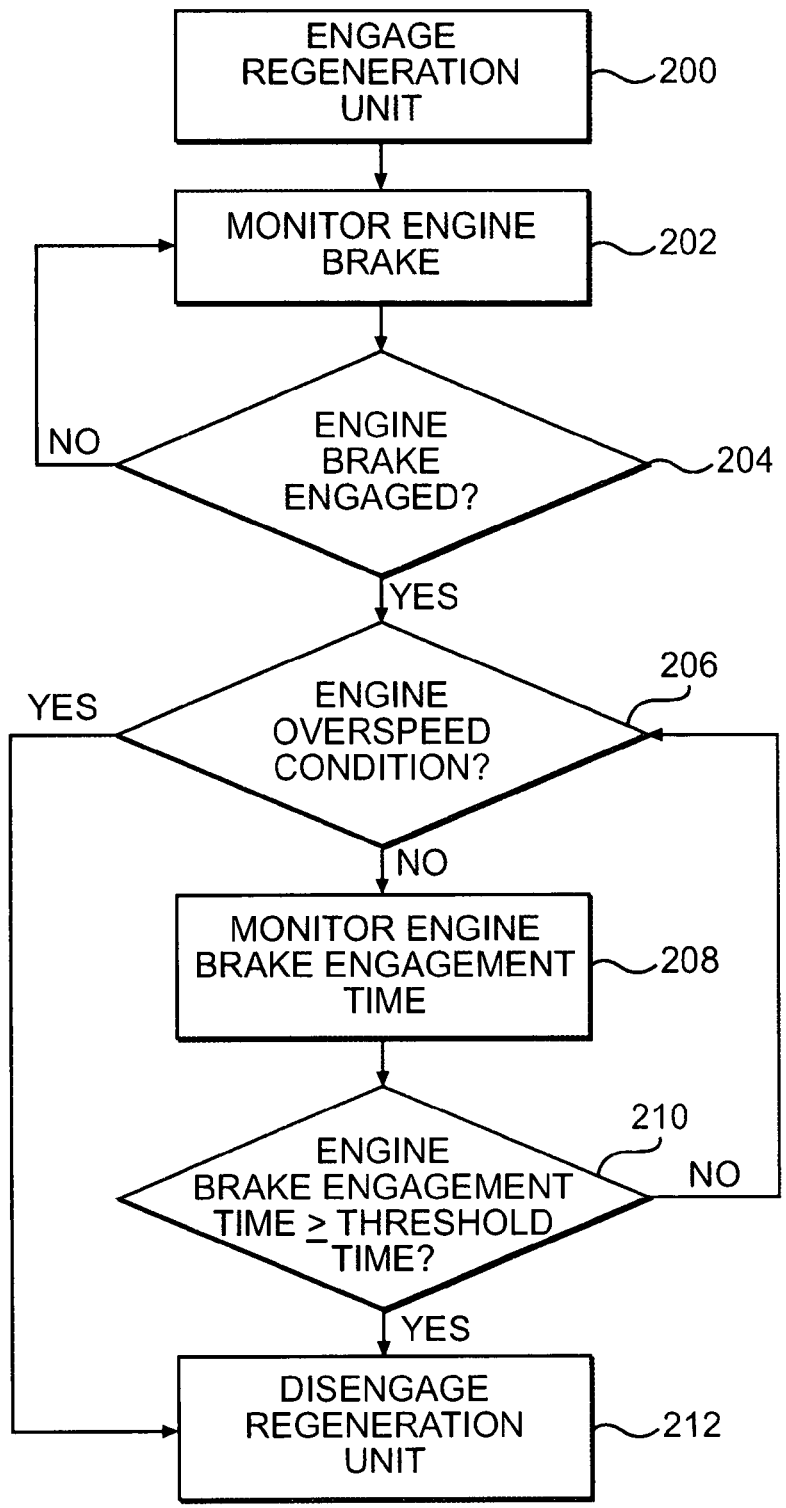
FIG. 4 is a flowchart depicting an exemplary disclosed method of operating the vehicle of FIG. 1.

FIG. 4 shows a flowchart illustrating an exemplary method of the disclosed regeneration system. FIG. 4 will be described in detail below.

Industrial Applicability

The disclosed regeneration system may be used with any vehicle system to ensure adequate braking while selectively allowing particulate trap regeneration. In particular, the disclosed regeneration system provides a simple, reliable way to alter the operation of a first performance enhancing subsystem, such as a regeneration system, while ensuring optimum operating capability for an interrelated second performance enhancing subsystem, such as an engine brake. The disclosed system ensures optimal engine braking by selectively deactivating regeneration. The operation of the power system 18 will now be described, in association with the disclosed regeneration system.

Atmospheric air may be drawn into compressor 36 where it may be pressurized to a predetermined level. Upon exiting compressor 36, the main portion of charged air from compressor 36 may pass through intake conduit 38 to power source 18. Fuel may be mixed with the pressurized air entering power source 18, and combusted to produce mechanical work and an exhaust flow. The exhaust flow may be directed from power source 18 through exhaust conduit 56 and after-treatment device 58, finally exiting to the atmosphere.

Based upon signals from power source 18, power source speed sensor 50, travel speed sensor 52, operator interface 14, and/or various other sources, and data contained in the maps stored in memory, controller 30 may activate engine brake 32. For example, operator interface 14 may include a brake pedal to actuate brake mechanism 26. If controller 30 determines that a brake pedal is actuated, and, based on input from travel speed sensor 52 and data contained in the maps, that greater deceleration than can be provided by brake mechanism 26 alone is necessary or desired, controller 30 may activate engine brake 32. When controller 30 activates engine brake 32, controller 30 may modulate engine brake actuator 42 to open exhaust valve 44 of power source 18 near TDC position 54 of piston 46. During engine braking, the kinetic energy of vehicle 10 may be transmitted through traction device 24, shaft 40, transmission 22, torque converter 20, and power source 18 to piston 46, where it may be converted into pressurized air and heat within the cylinders of power source 18, then exhausted to the atmosphere, thereby slowing vehicle 10.

Based upon signals from power source 18, temperature sensor 68, upstream pressure sensor 70, downstream pressure sensor 72, timing device 96, and/or various other sources, and data contained in the maps stored in memory, controller 30 may activate regeneration unit 60. For example, controller 30 may activate regeneration unit 60, when it is determined that power source 18 has been operating for a predetermined amount of time, power source 18 has consumed a predetermined amount of fuel, backpressure upstream of after-treatment device 58 has exceeded a predetermined pressure, pressure differential across after-treatment device 58 is greater than a predetermined amount, and/or a calculated amount of particulate matter accumulated in after-treatment device 58 is greater than a predetermined amount. Upon activation of regeneration unit 60, controller 30 may adjust a position of air valve 64 to divert air from intake conduit 38 to regeneration unit 60, fuel injector 62 to supply fuel to regeneration unit 60, and signal ignition source 66 to ignite the mixture of fuel and air within regeneration unit 60.

In some situations, full and simultaneous operation of both engine brake 32 and regeneration unit 60 may be undesired and/or impossible (i.e. a supply of air may be insufficient to meet demands of both engine brake 32 and regeneration unit 60). In these situations, controller 30 may operate as depicted in the flowchart of FIG. 4. Based on information communicated to controller 30 by power source 18, power source speed sensor 50, travel speed sensor 52, operator interface 14, and/or various other sensors, controller 30 may determine that regeneration unit 60 should be activated, as described above (Step 200). Controller 30 may then monitor the operating status of engine brake 32 (Step 202). If controller 30 determines that engine brake 32 is active (Step 204), controller 30 may then determine, based on inputs from power source speed sensor 50, travel speed sensor 52, and data contained in the maps, if an engine overspeed condition exists (Step 206). If an engine overspeed condition exists, controller 30 may deactivate regeneration unit 60 (Step 212). Deactivation of regeneration unit 60 may include adjusting a position of air valve 64 to reduce or prevent a diversion of air from intake conduit 38, adjusting fuel injector 62 to prevent injection of fuel, and ceasing operation of ignition source 66. Because the occurrence of an engine overspeed condition during engine braking may be indicative of a situation in which greater deceleration is desired, deactivation of regeneration unit 60 may provide a maximum amount of air to engine brake 32, thereby providing a maximum amount of engine braking.

If controller 30 determines that an engine overspeed condition does not exist, then controller 30 may use timing device 96 to determine engine brake 32 engagement time (Step 208). If controller 30 then determines that the engine brake 32 engagement time exceeds a predetermined time based upon the calculated time and/or the data contained in the maps (Step 210), controller 30 may deactivate regeneration unit 60 (Step 212). Because the activation of engine brake 32 for more than a predetermined time during regeneration may be indicative of a situation in which greater deceleration is desired, deactivation of regeneration unit 60 may provide a maximum amount of air to engine brake 32, thereby providing a maximum amount of engine braking.

The strategy implemented by controller 30 to regulate the subsystems of power source 18 may result in a more efficient and effective system. For example, the disclosed regeneration system may allow regeneration device 60 to provide effective regeneration of a particulate trap during normal operating conditions, while also providing maximum engine braking when necessary.

The strategy implemented by controller 30 to regulate the subsystems of power source 18 is described in this disclosure as being useful for controlling interaction between an engine brake and a regeneration unit, and it is further contemplated that similar strategies may be advantageous for interactions between an engine brake and other auxiliary devices or subsystems that may rely on a source of air shared with the engine brake. A similar strategy may be used to allow effective operation of such a device or subsystem under normal operating conditions, and to provide maximum engine braking when necessary.

It will be apparent to those skilled in the art that various modifications and variations can be made to the disclosed regeneration system without departing from the scope of the disclosure. Other embodiments of the regeneration system will be apparent to those skilled in the art from consideration of the specification and practice of the regeneration system disclosed herein. It is intended that the specification and examples be considered as exemplary only, with a true scope of the disclosure being indicated by the following claims and their equivalents.

What is claimed is:

1. A power system, comprising:
a source of intake air;
an engine brake configured to reduce the speed of an engine by compression and release of the intake air;
a valve configured to divert a portion of the intake air to a regeneration device, the regeneration device being configured to regenerate an after-treatment device; and
a controller in communication with the engine brake and the valve, the controller being configured to aid engine braking by moving the valve to reduce the portion of intake air diverted to the regeneration device based at least in part on the engine brake being active and based at least in part on detection of an overspeed condition of the engine.

2. The power system of claim 1, wherein the controller is configured to move the valve based at least in part on the engine brake being active for at least a first predetermined time.

3. The power system of claim 2, wherein the first predetermined time is less than about one minute.

4. The power system of claim 2, wherein the controller is further configured to prevent the diverting of intake air until after the engine brake has been inactive for a second predetermined time.

5. A power system comprising:
a source of intake air;
an engine brake configured to reduce the speed of an engine by compression and release of the intake air;
a valve configured to divert a portion of the intake air to a regeneration device, the regeneration device being configured to regenerate an after-treatment device; and
a controller in communication with the engine brake and the valve, the controller being configured to aid engine braking by moving the valve to reduce the portion of intake air diverted to the regeneration device based at least in part on the engine brake being active and based at least in part on a speed of the engine,
wherein the after-treatment device includes a particulate filter associated with an exhaust system of the engine and configured to remove particulate matter from an exhaust flow of the engine;
the regeneration device is configured to regenerate the particulate filter by removing particulate matter from the particulate filter; and
the diverted intake air is directed to the regeneration device.

6. The power system of claim 5, wherein the regeneration device includes a fuel injector configured to inject fuel into the exhaust flow, and the diverted intake air mixes with the injected fuel for combustion that heats the particulate filter.

7. A method of regenerating a particulate trap, comprising:
providing a supply of air to at least one combustion chamber of an engine;
diverting a portion of the supply of air to an auxiliary device;
slowing the engine using the remaining supply of air; and
reducing the portion of air diverted based at least in part on a speed of the engine exceeding a threshold limit, to increase the remaining supply of air used to slow the engine.

8. The method of claim 7, further including:
trapping particulate matter contained in the flow of exhaust from the engine; and
wherein the auxiliary device includes a regeneration device configured to use the diverted air to combust the trapped particulate matter.

9. The method of claim 7, wherein reducing the portion of diverted air includes preventing the diversion of air based at least in part on the engine being slowed for at least a predetermined time.

10. The method of claim 9, wherein the predetermined time is less than about one minute.

11. The method of claim 7, wherein slowing includes compression of the air in the at least one combustion chamber.

12. The method of claim 11, wherein slowing further includes releasing the compressed air to the atmosphere.

13. A power system, comprising:
an engine having at least one combustion chamber configured to combust a mixture of air and fuel to produce power and a flow of exhaust;
an induction system configured to supply the at least one combustion chamber with a flow of intake air;
an engine brake configured to reduce a speed of the engine by compression and release of the intake air;
a valve configured to divert a portion of the intake air from the induction system to an auxiliary device;
a controller in communication with the engine brake and the valve, the controller being configured to:
detect an overspeed condition of the engine; and
move the valve to reduce the portion of intake air diverted to the auxiliary device based at least in part on the engine brake being active and the overspeed condition being detected.

14. The power system of claim 13, further including:
an exhaust system configured to carry the flow of exhaust from the engine to the atmosphere;
a particulate filter associated with the exhaust system and configured to remove particulate matter from an exhaust flow of the engine; and
wherein the auxiliary device includes a regeneration device configured to remove particulate matter from the particulate filter, wherein the diverted intake air is directed to the regeneration device.

15. The power system of claim 14, wherein the regeneration device includes a fuel injector configured to inject fuel into the exhaust flow, and the diverted intake air mixes with the injected fuel for combustion that heats the particulate filter.

* * * * *